United States Patent Office 2,726,188
Patented Dec. 6, 1955

2,726,188

METHOD OF CONTROLLING THRIPS WITH SABADILLA SEED COMPOSITION

John R. Allison, Whittier, Calif., assignor to Leffingwell Company, Whittier, Calif., a corporation of California No Drawing. Application February 14, 1949,
Serial No. 76,405

6 Claims. (Cl. 167—24)

This invention relates to an insecticidal composition, and in particular concerns a composition adapted for the control of insects of the family Thripidae, e. g. citrus thrips (Scirtothrips citri). It further relates to a method of employing such composition in the control of Thripidae.

It is known that the seed of the sabadilla plant, of which a number of species of the genus Schoenocaulon are known, comprises an active principle which is toxic to insects and like organisms such as houseflies, lygus bugs, flea beetles, etc. It is further known (Allen, Journal of Economic Entomology, volume 38, page 291) that the toxicity of sabadilla seed may be markedly increased by combining it with an alkali such as hydrated lime or sodium carbonate hydrated lime, and consequently the sabadilla seed at present supplied to the trade contains about 50 per cent of lime. However, in attempting to employ commercial sabadilla seed containing lime for the control of insects of the family Thripidae, particularly citrus thrips, it has been found that the degree of control provided is not satisfactory.

It is accordingly an object of the present invention to provide an improved composition and method for the control of Thripidae.

Another object is to provide an improved insecticidal composition, particularly effective against Thripidae and comprising sabadilla seed as the principal toxicant.

A further object is to provide an improved composition and method for the control of citrus thrips, said composition and method involving the use of sabadilla seed in synergistic combination with a secondary insect toxicant.

Other objects and various advantages of the invention will be apparent from the following detailed description of the invention.

I have now found that the presence of hydrated lime in commercial sabadilla seed adversely affects the toxic action of the seed towards Thripidae, particularly citrus thrips. This is in direct contrast to the effect of lime on the toxicity of sabadilla seed towards other types of insects. I have further found that the toxicity of sabadilla seeed towards Thripidae may be synergistically increased by combining the seed with a minor proportion of pyrethrins or rotenone. Finally, I have found that the combination of sabadilla seed and pyrethrins is best employed against Thripidae in conjunction with a sweetening agent, e. g. sugar, which acts as a bait for the insects, and, further, that the composition may advantageously comprise an inert filler such as bentonite or the like. The composition provided by the invention thus essentially comprises sabadilla seed which is substantially free from lime or other alkali, pyrethrins or rotenone, a sweetening agent, and an inert filler, combined in the manner and in the proportions more fully set forth hereinafter.

The sabadilla seed which forms the principal toxic ingredient of the new composition may be derived from any of the various species of the sabadilla plant. Ordinarily the seed is processed merely by grinding to a relatively fine powder, although if desired it may be further subjected to heat treatment in accordance with known practice. As previously mentioned, commercial sabadilla seed supplied for insecticidal uses usually contains a substantial proportion, e. g. 25–60 per cent by weight, of dry hydrated lime. Such lime-containing product, however, is not suitable for use according to the present invention since I have found that the toxic action of sabadilla seed on Thripidae in the presence of lime decreases as the amount of lime increases from zero to about 25 per cent by weight of the sabadilla seed. At lime concentrations above about 25 per cent by weight of the sabadilla seed, the latter becomes quite ineffective towards Thripidae. Accordingly, it is required that the sabadilla seed product contain at most only 25 per cent by weight of lime or other alkali, and it is preferable that it be substantially alkali-free.

The secondary toxic agent which is employed in conjunction with the sabadilla seed is a plant toxic material of the nature of pyrethrins or rotenone. The amount of such agent required to synergistically activate the sabadilla seed is relatively small and accordingly I prefer to employ it as it occurs in the natural plant. A very satisfactory source of pyrethrins for the purpose of the present invention is provided by a material known as "pyrethrum marc," which is the fibrous material remaining after extraction of ground pyrethrum flowers with a solvent for the active principles thereof. This product contains a small amount of pyrethrins left unextracted by the solvent, e. g. 0.6–0.1 per cent by weight but such small amount is sufficient for the present purpose.

The inert filler employed in the new composition may be any of the dry inert materials commonly employed in finely-divided form as carriers or diluents for the active ingredients in insecticidal compositions. As examples of such materials there may be mentioned clay, talc, walnut shell flour, aluminum silicate, bentonite, starch, etc. Usually, it is preferred that such filler be of mineral origin.

The sweetening agent which is the fourth component of the new composition is conveniently ordinary cane sugar, although other sweet-tasting products such as molasses, corn syrup, glucose, dextrose, honey, etc., may be employed if desired.

In preparing the new composition it is convenient to prepare an initial mixture consisting of the sabadilla seed, secondary toxic agent, and inert filler, to which mixture the sweetening agent is later added, preferably at the time of use. The initial mixture will comprise from about 40 to about 60 percent by weight of sabadilla seed containing less than about 25 per cent by weight of lime, from about 20 to about 30 percent by weight of a plant material containing pyrethrins or rotenone, and from about 20 to about 30 per cent by weight of the dry inert filler. Such mixture is obtained simply by mechanically mixing the various components and may be stored indefinitely. The sweetening agent may be added to the initial mixture at any convenient time, preferably just prior to use, and is employed in an amount representing from about 25 to about 50 per cent by weight of the entire composition. The composition provided by the invention thus essentially comprises:

Sabadilla seed, 40–60% by weight  
Pyrethrum marc, 20–30% by weight } 50–75% by weight  
Filler, 20–30% by weight  
Sweetening agent_____ 25–50% by weight The above composition may be employed in the control of Thripidae either in dry form as an insecticidal dust, or it may be dispersed in water and applied as a liquid spray. For application on the larger form of plant life, e. g. trees, it is preferred to employ it in spray form. Such spray should be of approximately 0.2–3 per cent by weight concentration, and is conveniently prepared by dissolving the sweetening agent in the required amount of water and thereafter dispersing the remaining ingredients in the resulting aqueous solution with the aid of vigorous stirring. Such composition may be applied with any conventional spray equipment.

The following examples will illustrate several ways in which the principle of the invention has been applied, but are not to be construed as limiting the same.

Example I

Approximately 10 lbs. of pulverized lime-free sabadilla seed, 5 lbs. of pyrethrum marc, and 5 lbs. of bentonite were thoroughly mixed in the dry state and then dispersed in 100 gallons of water in which 6 lbs. of cane sugar had previously been dissolved. The resulting spray composition was applied to lemon trees at the rate of 100 gallons per acre, a 200-gallon Master Fan spray duster being employed for the application. Prior to spraying, examination of 100 representative terminals on the trees showed a citrus thrip infestation averaging 7.5 thrips per terminal. Thirty days after spraying, an examination of 50 representative terminals showed an average thrip count of 0.14 thrip per terminal. Three weeks later the thrip count averaged 0.56 thrip per terminal.

Example II

The following compositions were prepared by dissolving the indicated quantity of sugar in the water and thereafter adding a mixture of the remaining ingredients:

| Composition No. | 1 | 2 | 3 |
| --- | --- | --- | --- |
| Lime-free Sabadilla Seed, lbs | 8 | 8 | 8 |
| Pyrethrum Marc, lbs | 4 | 0 | 4 |
| Pyrophyllite, lbs | 4 | 4 | 4 |
| Hydrated Lime, lbs | 4 | 4 | 0 |
| Cane Sugar, lbs | 8 | 8 | 8 |
| Water, gals | 200 | 200 | 200 |

Each of the above compositions was applied as a spray at the rate of 100 gallons per acre to lemon trees infested with citrus thrips. A pre-spraying count showed the trees to bear an average of about 3.41 thrips per terminal. One week after spraying, each plot of trees was examined and a thrip count made on 50 representative terminals. Second and third counts were made at thirty-day intervals. The results obtained are tabulated as follows:

| Composition No. | Pre-Count | 7-Day Count | 37-Day Count | 67-Day Count |
| --- | --- | --- | --- | --- |
| 1 | 3.34 | 0.32 | 1.52 | 2.51 |
| 2 | 3.42 | 0.38 | 1.32 | 2.48 |
| 3 | 3.48 | 0.18 | 0.26 | 0.31 |

It will be seen from these data that the presence of lime seriously affects the control provided by the sabadilla seed, both in the presence and absence of pyrethrins.

Example III

*Composition 1.*—Approximately 7.5 lbs. of a mixture consisting of 50 per cent by weight of lime-free sabadilla seed and 25 per cent by weight each of pyrethrum marc and bentonite was dispersed in 200 gallons of water containing 4 lbs. of dissolved cane sugar.

*Composition 2.*—Approximately 7.5 lbs. of a commercial nicotine insecticide ("Black Leaf 155") was dispersed in 200 gallons of water containing 4 lbs. of dissolved cane sugar.

*Composition 3.*—Approximately 4 lbs. of tartar emetic, which is commonly employed for the control of thrips, was dispersed in 200 gallons of water containing 4 lbs. of dissolved sugar.

Each of these composition was applied to Valencia orange trees which were infested with citrus thrips to an extent averaging 8 thrips per terminal. Application was made with a 400-gallon boom sprayer at the rate of 200 gallons per acre. Thrip counts made subsequent to the treatment are tabulated as follows:

| Composition No. | Pre-Count | 7-Day Count | 37-Day Count | 67-Day Count |
| --- | --- | --- | --- | --- |
| 1 | 8.0 | 0.02 | 0.20 | 0.76 |
| 2 | 8.0 | 0.22 | 1.24 | 2.28 |
| 3 | 8.0 | 3.40 | 3.80 | 3.20 |

It will be noted that both the nicotine and tartar emetic compositions compared very poorly with that provided by the invention for the control of citrus thrips.

While the preceding examples illustrate practice of the invention for the control of citrus thrips, it will be understood that the same practice may be satisfactorily employed against other insects of the family Thripidae, e. g. greenhouse thrips, etc. Similarly, if desired, the composition may contain minor amounts of secondary components such as spreaders, sticking agents, dispersing agents, etc., and minor variations may be made in the relative proportions of the essential components without departing from the scope of the invention. Also, in some instances satisfactory control may be secured with compositions from which the plant toxic material has been omitted, in which case the composition will comprise from about 50 to about 75 per cent by weight of a mixture consisting of from about 40 to about 75 per cent by weight of pulverized sabadilla seed substantially free from lime or other alkali and from about 25 to about 60 per cent by weight of an inert mineral filler, and from about 25 to about 50 per cent by weight of a sweetening agent.

Other modes of applying the principle of my invention may be employed instead of those explained, change being made as regards the materials or methods disclosed, provided the products or steps stated by any of the following claims, or the equivalent of such stated products or steps, be employed.

I, therefore, particularly point out and distinctly claim as my invention:

1. The method of controlling insects of the family Thripidae borne by living plants which comprises applying to said plants bearing insects of the family Thripidae a toxic amount of a composition comprising (1) from about 50 to about 75 per cent by weight of a mixture consisting essentially of from about 40 to about 60 per cent by weight of pulverized sabadilla seed containing less than about 25 per cent of alkali based on the weight of the sabadilla seed, from about 20 to about 30 per cent by weight of a plant material containing an insect toxicant selected from the class consisting of pyrethrins and rotenone, and from about 20 to about 30 per cent by weight of an inert finely-divided solid insecticide carrier; and (2) from about 25 to about 50 per cent by weight of a sweetening agent.

2. The method of controlling insects of the family Thripidae borne by living plants which comprises applying to said plants bearing insects of the family Thripidae a toxic amount of a composition comprising (1) from about 50 to about 75 per cent by weight of a mixture consisting essentially of from about 40 to about 60 per cent by weight of pulverized sabadilla seed substantially free from alkali, from about 20 to about 30 per cent by weight of pyrethrum marc, and from about 20 to about 30 per cent by weight of an inert finely-divided mineral solid insecticide-carrier; and (2) from about 25 to about 50 per cent by weight of a sweetening agent.

3. The method of controlling insects of the family Thripidae borne by living plants which comprises dispersing in water between about 0.2 and about 3 per cent by weight of a composition comprising (1) from about 50 to about 75 per cent by weight of a mixture consisting essentially of from about 40 to about 60 per cent by weight of pulverized sabadilla seed containing less than about 25 per cent of alkali based on the weight of sabadilla seed, from about 20 to about 30 per cent by weight of a plant material containing an insect toxicant selected from the class consisting of pyrethrins and rotenone, and from about 20 to about 30 per cent by weight of an inert finely-divided solid insecticide-carrier, and (2) from about 25 to about 50 per cent by weight of a sweetening agent; and applying a toxic amount of the aqueous dispersion so formed to said living plants bearing said insects of the family Thripidae.

4. The method of controlling insects of the family Thripidae borne by living plants which comprises dispersing in water between about 0.2 and about 3 per cent by weight of a composition comprising (1) from about 50 to about 75 per cent by weight of a mixture consisting essentially of from about 40 to about 60 per cent by weight of pulverized sabadilla seed substantially free from alkali, from about 20 to about 30 per cent by weight of pyrethrum marc, and from about 20 to about 30 per cent by weight of an inert finely-divided mineral solid insecticide-carrier, and (2) from about 25 to about 50 per cent by weight of a sweetening agent; and applying a toxic amount of the aqueous dispersion so formed to said living plants bearing said insects of the family Thripidae.

5. The method of controlling insects of the family Thripidae borne by living plants which comprises applying to said plants bearing insects of the family Thripidae a toxic amount of a composition comprising (1) from about 50 to about 75 per cent by weight of a mixture consisting essentially of from about 40 to about 75 per cent by weight of pulverized sabadilla seed substantially free from alkali, and from about 25 to about 60 per cent by weight of an inert finely-divided mineral solid insecticide-carrier, and (2) from about 25 to about 50 per cent by weight of a sweetening agent.

6. The method of controlling insects of the family Thripidae borne by living plants which comprises dispersing in water between about 0.2 to about 3 per cent by weight of a composition comprising (1) from about 50 to about 75 per cent by weight of a mixture consisting essentially of from about 40 to about 75 per cent by weight of pulverized sabadilla seed substantially free from alkali, and from about 25 to about 60 per cent by weight of an inert finely-divided mineral solid insecticide-carrier, and (2) from about 25 to about 50 per cent by weight of a sweetening agent; and applying a toxic amount of the aqueous dispersion so formed to said living plants bearing said insects of the family Thripidae.

References Cited in the file of this patent

UNITED STATES PATENTS

| | | |
|---|---|---|
| 2,024,392 | Schotte et al. | Dec. 17, 1935 |
| 2,092,308 | Gnadinger | Sept. 7, 1937 |
| 2,348,949 | Allen et al. | May 16, 1944 |
| 2,423,284 | Babbini | July 1, 1947 |

OTHER REFERENCES

McDonnell et al.: U. S. D. A. Dept. Bull. No. 824, entitled "Insect Powder," April 1926.

Allen et al.: J. Econ. Ent. vol. 38, pp. 291-3 (1945).

Dethier: "Chem. Insect Attractants and Repellants," pg. 174, Blakiston Co., Phil.